Dec. 15, 1953  W. J. JACOBSSON  2,662,348
FLUID PRESSURE REGULATOR
Filed July 24, 1947  2 Sheets-Sheet 1

INVENTOR
WILGOT J. JACOBSSON
BY
ATTORNEY

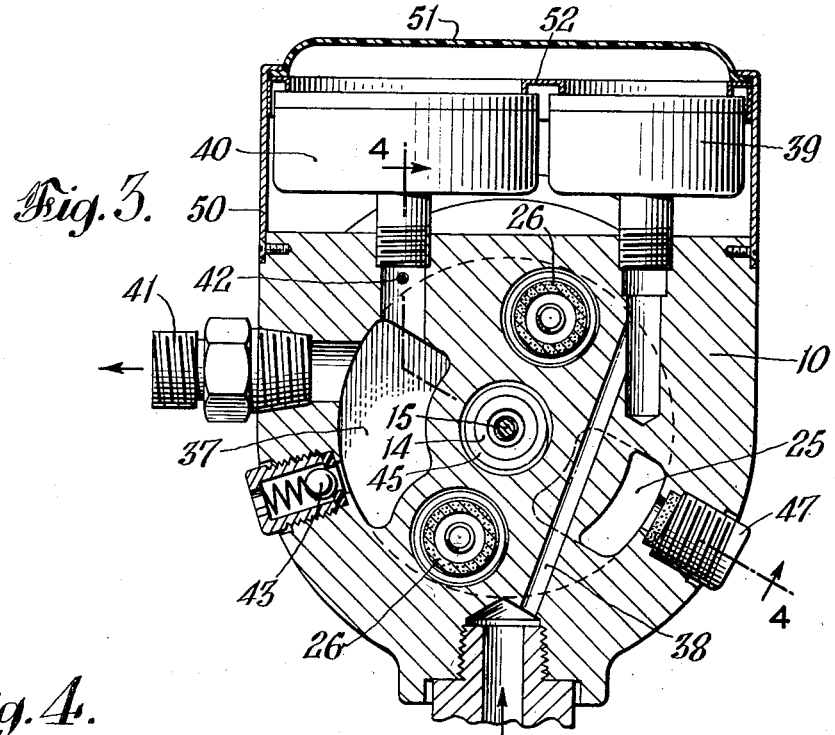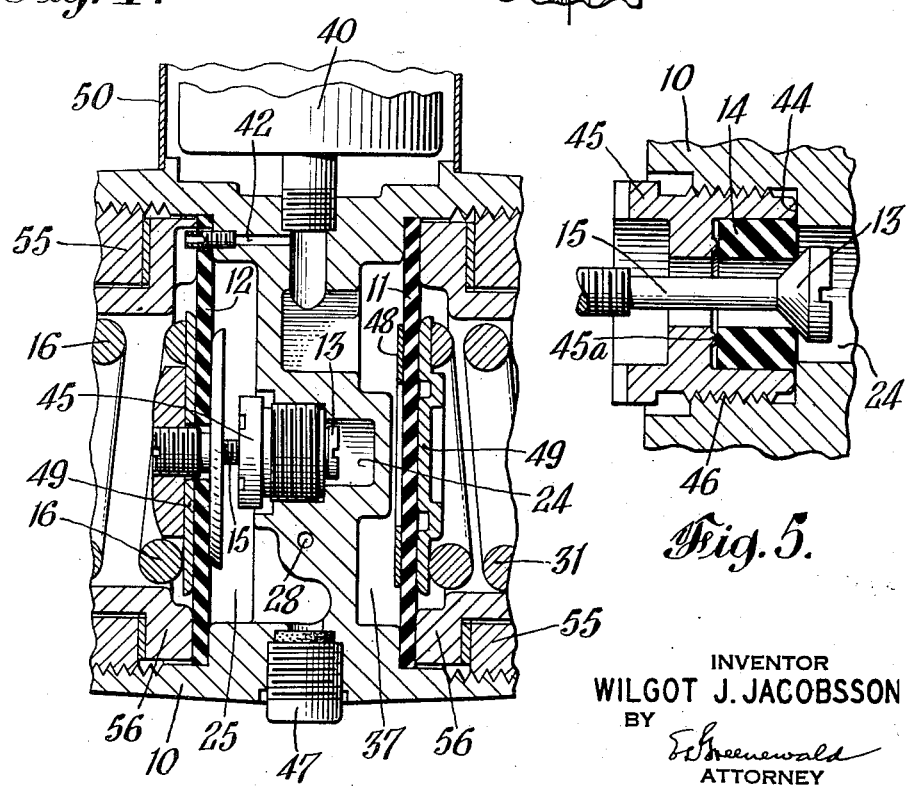

Patented Dec. 15, 1953

2,662,348

UNITED STATES PATENT OFFICE 2,662,348

FLUID PRESSURE REGULATOR

Wilgot J. Jacobsson, Plainfield, N. J., assignor, by mesne assignments, to Union Carbide and Carbon Corporation, a corporation of New York Application July 24, 1947, Serial No. 763,374

22 Claims. (Cl. 50—23)

This invention relates to a fluid pressure regulator and has for an object to improve its sensitiveness and accuracy. Another object is to provide a regulator which is adapted to return to the original pressure delivery value after the fluid pressure supply has been shut off and again turned on. A further object is to enhance the compactness of such a regulator and at the same time reduce wear and eliminate hum without the necessity for the imposition of the customary friction load heretofore thought necessary for that purpose. Still another object is to provide a regulator which is light in weight and easy to assemble or to take apart for service and repair.

In striving for accuracy and sensitiveness in reducing the pressure of gases stored in cylinders, it has long been customary to reduce pressure in two stages, the second or final stage reduction in pressure being smaller and more precise while in the first stage it is usually larger and less accurate. In the present invention one factor contributing to greater sensitiveness in the second stage valve is the elimination of friction heretofore believed necessary in avoiding wear and hum. According to the present invention it has been discovered that when a self-aligning valve of the type described in my prior Patent No. 2,612,728 for "Fluid Pressure Regulator" is mounted to respond to diaphragm movement at a position offset from the center of the diaphragm, no friction is necessary for either the suppression of hum or for the guiding of the valve stem whereby a more sensitive and more nearly frictionless valve is provided. In attempting to obtain greater accuracy in the regulator when gas has been shut off and is again turned on and to insure the subsequent delivery pressure being as near the former as possible, great improvements have been made in the present invention in which the delivery pressure is maintained as close as .01 pound per square inch within the former value after gas has been shut off and again turned on. One factor contributing to this result is great spring constancy obtained by securing each end of a diaphragm spring to its plate so that when pressure is relieved from the diaphragm spring there is no danger of the plate at either end of the spring moving transversely with respect to the spring axis or angularly with respect to the spring. Another factor contributing to the aforementioned improvement is the combination of the aforesaid frictionless self-aligning valve with a spring having its ends secured to plates to maintain such constancy. Another factor contributing to spring constancy is the provision of some well known type of means for obtaining elimination of backlash from the threads of the adjusting screw for a second stage diaphragm spring.

Referring to the drawings:

Fig. 3 is a section on the line 3—3 of Fig. 2;

Fig. 4 is a section on the line 4—4 of Fig. 3;

Fig. 5 is a detail of the first stage valve and the mounting for its seat.

Figure 1:
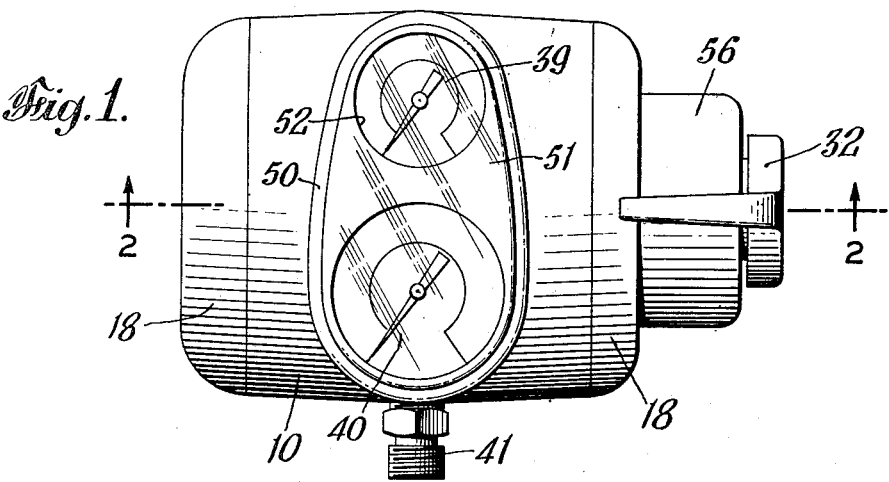
Fig. 1 is a side view of a regulator embodying the present invention.

The main body portion of the regulator comprises a cylindrical housing or casing 10 shaped to provide supporting abutments or ledges for the flexible diaphragms 11 and 12. The first stage or high pressure diaphragm 12 controls a movable valve member of the attached type comprising a customary tapered movable valve member 13 cooperating with a flexible seat portion 14. As is customary with attached type valves the higher the fluid pressure on the diaphragm 12 the greater is the flexure of the diaphragm against its spring and the tighter is the pressure between the valve member 13 and its seat 14. A valve stem 15 is screwed into one of the metal plates between which the diaphragm 12 is clamped. A strong spring 16 presses against fluid pressure on the opposite side of the diaphragm 12 after opening the valve. Screws 17 secure casing end portions 18 in place against the main housing or casing. An adjusting screw 20 for the spring 16 controls its pressure, the screw 20 being rotated upon insertion of a wrench in the socket 19 of the screw after the casing end portion 18 has been removed.

High pressure fluid enters at the passage or pipe connection 21 leading from the source of high pressure fluid such as a cylinder or pump. The sintered bronze filter 22 not only serves as a filter but when the pores are of small size is adapted to function also as a backfire suppressor. The high pressure passage 23 leads to the high pressure chamber 24 and when the valve member 13 is at least partially open some of the fluid passes to the intermediate pressure chamber 25. A second filter and backfire extinguisher 26 of the type described in said aforementioned Patent No. 2,612,728 functions to support a valve closing spring located therein for closing the second stage valve by urging the rubber-like seat portion against the stationary nozzle part 27. The flexible rubber-like disc 28 has its inner portion serving as the seat to cooperate with the nozzle 27 whereas its outer portion is made more flexible than the inner seat part by the provision of a plurality of perforations 29. The peripheral part of the flexible disc 28 is clamped as shown and as is described in said prior application. This second stage valve is of the detached type having a stem 30 for cooperation with the diaphragm 11, the stem 30 being moved to the left in Fig. 2 when the fluid pressure on the diaphragm 11 is reduced so that the spring 31 flexes the diaphragm on opening the valve. The spring within the filter 26 is only strong enough to close the valve by moving the stem and seat. The disc 28 guides the stem 30 in valve closing movement.

The handle 32 for adjusting the pressure of spring 31 is of metal or other appropriate material and rotatable but does not move in or out of the casing. A stem portion 33 of hexagonal cross section is molded in the handle portion 32 and is adapted to rotate the threaded tube which the stem 33 fits. A split nut 34 of a phenolic condensation product has back lash or play in the threads of the usual adjusting screw eliminated from it, any suitable back lash eliminator mechanism being appropriate for this purpose. The adjusting screw 33a between the nut 34 and the stem 33 is moved axially to adjust the pressure of the spring 31. Looseness or back-lash between the threads of screw 33a and nut 34 is eliminated due to the absence of any longitudinal thrusts from the actuating handle portion 32 ever reaching screw 33a and due to pressure of spring 31 being applied always while in use between screw 33a and nut 34. The sliding fit between stem 33 and screw 33a precludes any longitudinal thrusts on stem 33 from reaching the screw 33a. A metal retaining ring 35 is molded in the handle portion 32 and when the screw 36 engages this ring the handle portion is not removable but on backing off these screws 36 the handle with its stem 33 may be withdrawn for shipment or repair.

After passing the second stage valve fluid enters the low pressure chamber 37. On the side of the main housing and close to it are located a pair of pressure gauges as shown in Figs. 1 and 3. A high pressure passage 38 leads to the high pressure gauge 39. A low pressure gauge 40 is connected to the low pressure chamber 37 as illustrated in Fig. 3. A low pressure outlet connection 41 leads from the low pressure chamber 37. As shown in Figs. 3 and 4 the low pressure passage 42 leads from the low pressure chamber 37 into the enclosure around the spring 16 of the high pressure diaphragm in order to reduce the size of the spring 16 and allow fluid pressure as well as spring pressure to act upon the diaphragm 12. Such additional fluid pressure is not necessary. A pressure relief valve 43 is supplied to safeguard the low pressure chamber 37. Another pressure relief valve 47 is supplied for the intermediate pressure chamber 25.

While a flexible seat material is desirable for the high pressure or first stage valve, rubber has not been suitable because it is not adapted for pressures in excess of about 500 pounds per square inch. The material 14 for the first stage valve seat is a polytetrafluoroethylene known commercially as Teflon. This material is adapted for much higher pressures than rubber and for very wide temperature differences. It maintains its flexibility under conditions of temperature and pressure far beyond those for which rubber is adapted. An abutment wall 44 of the housing 10 is finished so that when the seat holder 45 is screwed into position its inner edge cooperates with the wall 44 to form a metal to metal gastight seal. The seat material 14 is preferably loosely held in its recess so as to be substantially unstressed when the valve is open. The wall 44 in Fig. 5 is shown as extending radially inward just far enough to constitute a support for the seat material 14. When the movable valve member 13 engages the seat 14 it is pressed against the small projecting ring 45a and deformed to provide a gastight seal around said ring 45a and also the seat is extended radially outward slightly against the inner wall of the seat holder. In this manner an effective high pressure first stage valve is provided that is gastight. To remove the seat holder it is unscrewed. Each of the diaphragms 11 and 12 is provided with the usual plates 49 against which its spring acts. The low pressure diaphragm 11 has preferably vulcanized thereto a ring 48 which need be only wide enough to provide a bearing surface for the second stage valve stem 30. The low pressure diaphragm plate 49 is made immovable and non-rotatable with respect to the diaphragm by the provision of small projections and recesses between the plate and diaphragm.

Figure 2:
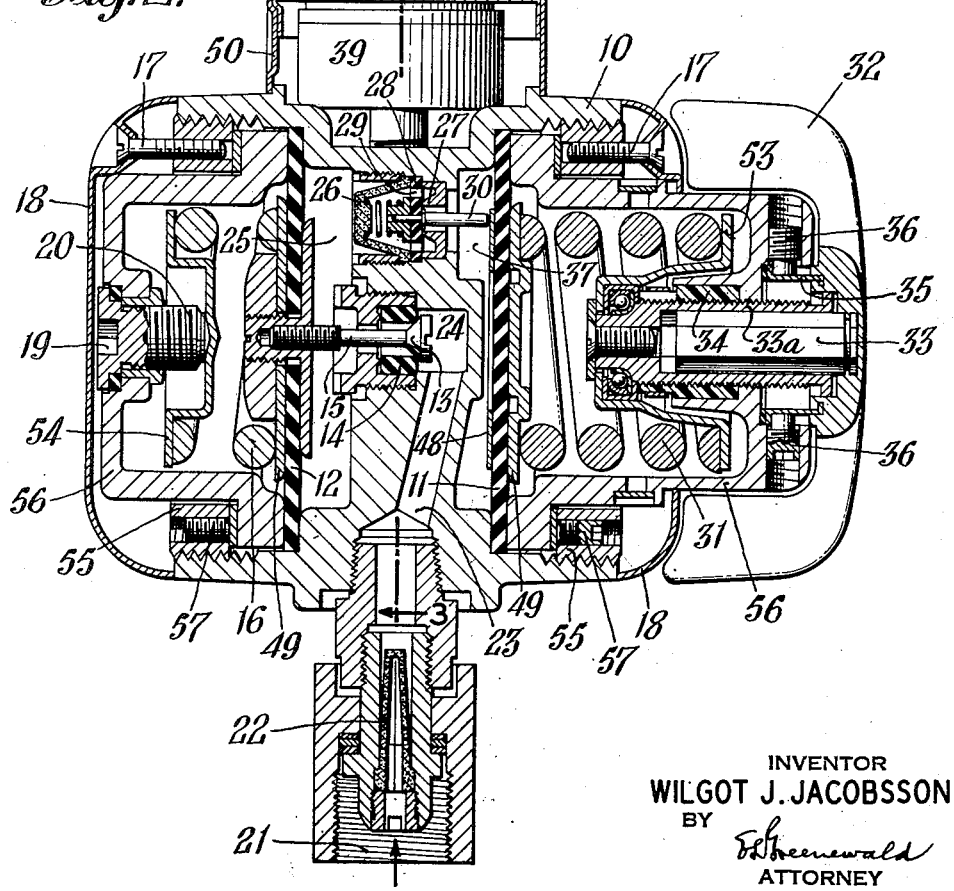
Fig. 2 is a section on the line 2—2 of Fig. 1.

The casing 50 for the gauges 39 and 40 has a transparent crystal 51 of any appropriate material held in place by some customary form of retaining means 52 shown in Figs. 2 and 3. Fig. 3 of the drawing shows the substantially parallel pressure lines are short as they lead to the gauges 39 and 40 and the gauges are located in substantial alignment in a plan normal to the axis of the housing 10.

As shown in Figs. 2 and 4 plates 53 and 54 are for adjusting the compression of the springs 16 and 31. Large nuts 55 are threaded into the housing 10 through each end as shown in Fig. 2 for holding the casing or frame 56 for clamping the diaphragms 11 and 12. Bolts 57 provided with sockets are in threaded engagement within the nuts 55 and pressed against the frame 56 for holding the diaphragms 11 and 12 clamped in position. By means of the bolts 57 pressure is transmitted from a nut 55 to the diaphragm clamping frame 56 so that by using a plurality of such screws or bolts 57 the pressure on the diaphragms may be equalized around its periphery. Another advantage of these Allen screws 57 is that they are much easier to adjust under pressure than the large nut 55. In case of excess pressure of dangerous value being applied to the diaphragm for any reason the threads which engage these Allen screws will be deformed enough for the threads of the nuts 55 to withstand that excess pressure.

When increased capacity of fluid under pressure is desired the high pressure valve may be made larger. To increase the capacity for the second stage valve two or more of them may be arranged about the first stage valve as shown in Fig. 3. When a plurality of second stage valves are used, one of them may be opened in advance of the other or others. Such sequential opening of the second stage valves may be accomplished in several ways. For example the spring plate 49 is seldom uniformly loaded around its periphery by its spring, that portion of the plate which is more heavily loaded by the spring will cause the second stage valve in cooperation therewith to be opened slightly in advance of the other second stage valve or valves. This valve which is the first to open becomes more sensitive to small reductions in pressure. The diaphragm under the spring plate is always substantially parallel to the plate so that flexure of the diaphragm is largely localized to the portion outside the spring plate and radially inside its clamped edges. The valve stem 30 should always be radially within the portion of its diaphragm spring plate 49 which is contiguous to the diaphragm. The sequential openings of the second stage valves might also be obtained by making one of the valve closing springs inside the filter 26 stronger than another.

To retain the diaphragm springs fixed with respect to its end plate each end of such spring is cemented to a plate by means of a rubber adhesive, synthetic rubber adhesive or any suitable plasticized cement. The advantage of retaining the spring fixed with respect to such end plate is to prevent movement of the plate either transversely or rotatively with respect to the spring. While it has been customary to provide inner or outer guides for diaphragm springs, the present use of adhesive is equivalent to cutting down the clearance between such guides and spring convolutions. As the diaphragm flexes or pressure on the spring changes, the end of the spring contiguous the diaphragm is fixed with respect to the diaphragm while the other end of the spring and its plate is capable of limited rotation, due to the tendency of any spring to wind and unwind as the stress upon it changes. The ball bearing mounting is provided only for the end plate 53 since it is the second stage valve or valves that must be the most sensitive and accurate.

Where the housing 10 is designed to accommodate two second stage valves, only one may be used if desired by removing one of the second stage valves and gastightly plugging the opening it normally occupies. Commonly this regulator might be used as a single stage regulator by removing the seat holder 45 of the first stage valve so that the high pressure chamber 24 and the intermediate pressure chamber 25 are connected without pressure drop. For lightness in weight the housing 10 is preferably made of aluminum.

Among the advantages of this invention may be mentioned the ability of the regulator to return to its original pressure setting after the high pressure fluid has been shut off and then reopened. Its improved accuracy is believed to be due to the self-aligning second stage valve with its frictionless stem being guided and supported entirely by the flexible disc or diaphragm 28 which serves both as a low pressure valve seat, and as the support and guide for the stem and it flexes to permit opening the valve. The second stage valve spring being adhesively secured to its end plates is another factor contributing to this new result. Compactness is obtained by having both valves longitudinally overlapping and by having the high pressure diaphragm spring made lighter and thereby using low pressure fluid to assist the spring action. Both pressure gauges are compactly mounted against the main housing in a small casing. The fluid pressure connection between the low pressure chamber and the high pressure spring is within the main housing and does not extend outside of such main housing where it might get in the way of anything nearby moving. The handle portion 32 being rotatable but not movable axially in or out in normal adjustment of the second stage valve contributes also to compactness of the overall length required for the regulator in all positions of adjustment of such handle. The increased accuracy of the present regulator is due to many features among which may be mentioned, the small creep, so small that it can hardly be measured in the self-aligning second stage valve with frictionless stem; a small jump is due to spring constancy on the large spring used. Hum has been eliminated from the eccentric or off center loading of the diaphragm by this second stage valve thereby eliminating the need for the usual friction hum suppressor. Thrusts on the handle 32 are not transmitted to the spring 31 because the stem 33 is slidable in the pressure adjusting screw 33a. The seats of both the high and low pressure valves are sufficiently yieldable to compensate for any slight misalignment there may be. A flat discharge characteristic is due to the combination of fluid and spring pressure on the high pressure diaphragm with a large ratio of diaphragm area to effective seat area for both the high and low pressure valves. The cooling due to expanding gas passing the first stage valve has a minimum effect on the seat material 14 mentioned which is believed to retain its flexibility and adequate softness. The stem 30 contacts its plate 48 radially within the edge portion of the plate 49 contiguous the diaphragm so that if the plate 49 were uniformly loaded by the spring throughout its periphery the diaphragm and plate 48 are moved uniformly throughout. Each plate 49 may be vulcanized to its diaphragm 11 but such is not necessary, the plates being non-rotatably secured to their diaphragms by means of interlocking recesses and projections without any bonding means. The uniform and small wear results from the self-aligning valves having yieldably mounted seats and the elimination of any tendency to hum without the usual friction load. The use of sequentially operated second stage valves enables the first valve to open to be very sensitive. Few tools are necessary in assembly or demounting, these including the Allen wrench for the sockets of the bolts 57, an Allen wrench for the socket 19 to adjust the stress in the high pressure spring 16, a socket wrench for seat holder 45, an adjustable open end wrench for the diaphragm nut on the high pressure diaphragm and a small screwdriver.

I claim:

1. A fluid pressure device having a flexible diaphragm, a casing for said device non-rotatably clamping said diaphragm, a spring between said casing and diaphragm, a plate non-rotatably held to said diaphragm between said spring and diaphragm, a valve on the side of said diaphragm opposite said spring, a stem for said valve cooperating with said diaphragm radially within the portion of the plate contiguous the diaphragm, one end of said spring being non-rotatably secured to the plate, a plate with which the opposite end of said spring cooperates, and a spring adjusting screw between said casing and last mentioned plate and with respect to which said plate is freely rotatable.

2. A two stage regulator comprising a pair of spaced high and low pressure diaphragms, a cylindrical housing against the ends of which the diaphragms are clamped, first and second stage valves in said housing between said diaphragms, a spring pressing each diaphragm toward its valve, high, low and intermediate pressure chambers within said housing between said diaphragms, high and low pressure connections to said housing, a pair of passages leading one from the high pressure chamber and the other from the low pressure chamber, a pair of gauges connected to said pair of passages and aligned transversely of the axis of said housing and contiguous said housing, a casing enclosing said gauges and contiguous and outside a cylindrical surface of said housing, a crystal common to both gauges, and crystal securing means in said casing.

3. A fluid pressure regulator comprising a valve, a flexible diaphragm for actuating said valve, a casing for said valve clamping said diaphragm against rotation, a spring between said casing and diaphragm, a plate non-rotatably secured with respect to each of and between said diaphragm and spring, a screw for adjusting the stress of said spring, and a rotatable plate between said spring and screw anti-friction bearings between said screw and rotatable plate for the plate to be freely rotatable on compression of said spring, the ends of said spring being adhesively secured to its plates, whereby any minute tilt of said diaphragm due to non-uniformity in distribution of spring pressure is always the same at any given pressure setting of said spring.

4. A two stage gas pressure regulator comprising in combination a housing, a diaphragm clamped to each of opposite sides of the housing, high and low pressure valves in said housing each responsive to movement of a diaphragm, at least one of said valves having a stem eccentrically engaging its diaphragm, high, low, and intermediate pressure chambers in said housing, a gas tight casing contiguous the high pressure diaphragm on its side opposite its valve, a spring cooperating with said casing and engaging said high pressure diaphragm, a gas passage within said housing connecting the low pressure chamber with the inside of said casing whereby both fluid and spring pressure act on said high pressure diaphragm, the low pressure valve having a movable and yieldable seat element which is yieldably mounted to make the valve self-aligning, the high pressure valve having a yieldable and relatively immovable seat element which is floating and free of any clamping stress thereon when the valve is open, the low pressure diaphragm having a spring engaging it on the side opposite the valve, a plate at each end of the low pressure diaphragm spring, a casing around said last mentioned spring, means for adjusting the compression of said last mentioned spring, and means non-rotatably securing the spring and plate at the diaphragm end thereof, the plate between said spring and diaphragm being non-rotatably secured to said low pressure diaphragm.

5. A regulator comprising a diaphragm, a spring cooperating with said diaphragm on at least one side thereof, a plurality of valves responsive to movement of said diaphragm and located on the side thereof opposite said spring, each of said valves having a tiltable stem directly secured to and aligned with it and cooperating with said diaphragm at a location displaced from the diaphragm center, a plate between said spring and diaphragm, and a rod from each valve to said diaphragm, each rod engaging said diaphragm within the area of said plate and within the area throughout which the plate is contiguous said diaphragm, at least one valve being adapted to open in advance of the remainder due to the plate being non-uniformly loaded peripherally by said spring.

6. A fluid pressure two stage regulator comprising in combination a housing, coaxial diaphragms clamped on opposite sides of said housing, an axial first stage valve of the attached type responsive to movement of one diaphragm, said valve including a movable tapered member and a yieldable seat member into which the movable member is moved by said diaphragm, said seat being of a rubber-like material adapted to withstand a fluid pressure drop of greatly in excess of 500 pounds per square inch under wider temperature ranges than rubber is adapted to withstand, a second stage valve off-set from the diaphragm centers and responsive to movement of the other diaphragm, a stem for said last mentioned valve, a flexible disc secured to said stem constituting a seat for said last mentioned valve and also a guide for said stem and seat, the rim of said disc being clamped, a spring pressing the last mentioned diaphragm toward the second stage valve, a plate between said spring and diaphragm immovably secured to said diaphragm, a clamp for the diaphragm edges, a screw for adjusting the compression of said second stage spring, a rotatable plate between said screw and spring, and an adhesive securing each end of said second stage spring to its plate, said second stage valve stem engaging its diaphragm radially within the area of its plate contiguous thereto.

7. In a two-stage fluid pressure regulator comprising a generally cylindrical housing having therein a high pressure chamber, an intermediate pressure chamber, a low pressure chamber, a high pressure fluid inlet passage communicating with said high pressure chamber, a low pressure fluid outlet passage communicating with said low pressure chamber, substantially axially aligned pressure-responsive diaphragms, and valves with stems in said housing controlling communication between said chambers, a high pressure gauge secured to said housing and communicating with said high pressure chamber, a low pressure gauge secured to said housing and communicating with said low pressure chamber, such gauges being disposed side by side in substantially the same plane close to and contiguous to an outer side of said wall of said housing, and a casing secured to said housing and enclosing both such gauges, said gauges having an axial plane through the center of each intermediate said pressure responsive diaphragms and passing transversely through said valve stems.

8. In a two-stage regulator having an inlet passage, a high pressure chamber to which said passage leads, a low pressure chamber, an outlet passage from said low pressure chamber, a first stage valve receiving fluid from said high pressure chamber, an intermediate pressure chamber into which fluid is discharged after passing through said first stage valve, a second stage valve between said intermediate and low pressure chambers, a flexible diaphragm to which said first stage valve is responsive, and a second diaphragm to which the second stage valve is responsive, the combination therewith of the improvement enhancing the accuracy and sensitiveness of the regulator and particularly that of said second stage valve, said improvement including at least two second stage valves between the intermediate pressure chamber and the low pressure chamber, and mechanism connecting each valve with said second diaphragm for opening one valve ahead of another, which mechanism includes a stem for each valve and a sole guide for each stem having a flexible disc, a radially inner portion of which constitutes a yieldable seat, at least one of said second stage valves being laterally offset from the center of its actuating diaphragm.

9. In a two stage regulator having an inlet passage, a high pressure chamber to which said passage leads, a low pressure chamber, an outlet passage from said low pressure chamber, a first stage valve receiving fluid from said high pressure chamber, an intermediate pressure chamber into which fluid is discharged after passing through said first stage valve between said intermediate and low pressure chambers, a flexible diaphragm to which said first stage valve is responsive, and a second diaphragm to which the second stage valve is responsive, the combination therewith of the improvement enhancing the accuracy and sensitiveness of the regulator and particularly that of said second stage valve, said improvement including at least two second stage valves between the intermediate pressure chamber and the low pressure chamber, and mechanism connecting each valve with said second diaphragm for opening one valve ahead of another, which mechanism includes a stem for each valve and a sole guide for each stem having a flexible disc, the radially inner portion of which disc constitutes a yieldable seat, each second stage valve stem engaging said second diaphragm at a position offset from its center.

10. In a two stage regulator having an inlet passage, a high pressure chamber to which said passage leads, a low pressure chamber, an outlet passage from said low pressure chamber, a first stage valve receiving fluid from said high pressure chamber, an intermediate pressure chamber into which fluid is discharged after passing through said first stage valve, a second stage valve between said intermediate and low pressure chambers, a flexible diaphragm to which said first stage valve is responsive, and a second diaphragm to which the second stage valve is responsive, the combination therewith of the improvement enhancing accuracy in said regulator and its ability to return more nearly its former value of outlet pressure after its supply of high pressure gas has been shut off, said improvement including a plate non-rotatably secured to said second diaphragm, a diaphragm spring, a freely rotatable plate for the end of said spring remote from said diaphragm, the diaphragm end of said spring being immovably fixed to its plate and diaphragm, said plate remote from said second diaphragm being rotatably mounted in anti-friction bearings whereby said last mentioned plate may rotate as the stress on the spring is changed without rotation of an opposite end of said spring affecting accuracy of pressure setting due to angular displacement of the spring, an adjusting screw for varying the compression of said spring, a stationary nut with which said screw cooperates, and mechanism for elimination of backlash or looseness in the threaded engagement between the screw and nut.

11. In a two stage regulator having an inlet passage, a high pressure chamber to which said passage leads, a low pressure chamber, an outlet passage from said low pressure chamber, a first stage valve receiving fluid from said high pressure chamber, an intermediate pressure chamber into which fluid is discharged after passing through said first stage valve, a second stage valve between said intermediate and low pressure chambers, a flexible diaphragm to which said first stage valve is responsive, and a second diaphragm to which the second stage valve is responsive, the combination therewith of the improvement enhancing the accuracy and sensitiveness of the regulator and particularly that of said second stage valve, said improvement including at least two second stage valves between the intermediate pressure chamber and the low pressure chamber, and mechanism connecting each valve with said second diaphragm for opening one valve ahead of another, a plate non-rotatably secured to said second diaphragm, a diaphragm spring, and a plate for the end of said spring remote from said diaphragm, the end of said spring adjacent said diaphragm being immovably fixed to its plate, said plate remote from said second diaphragm being rotatably mounted in anti-friction bearings.

12. In a two stage regulator having an inlet passage, a high pressure chamber to which said passage leads, a low pressure chamber, an outlet passage from said low pressure chamber, a first stage valve receiving fluid from said high pressure chamber, an intermediate pressure chamber into which fluid is discharged after passing through said first stage valve, a second stage valve between said intermediate and low pressure chambers, a flexible diaphragm to which said first stage valve is responsive, and a second diaphragm to which the second stage valve is responsive, the combination therewith of the improvement enhancing the accuracy and sensitiveness of the regulator and particularly that of said second stage valve, said improvement including at least two second stage valves between the intermediate pressure chamber and the low pressure chamber, and mechanism connecting each valve with said second diaphragm for opening one valve ahead of another, which mechanism includes a stem for each valve and a sole guide for each stem having a flexible disc, a radially inner portion of which constitutes a yieldable seat, a plate non-rotatably secured to said second diaphragm, a diaphragm spring, a plate for the end of said spring remote from said diaphragm, the diaphragm end of said spring being immovably fixed to its plate, said plate remote from said second diaphragm being rotatably mounted in anti-friction bearings, an adjusting screw for varying the compression of said spring, a handle for said screw, a stationary nut with which said screw cooperates and mechanism for elimination of back lash or looseness in the threaded engagement between the screw and nut, whereby thrust on said handle longitudinally of said screw is not transmitted to said spring, diaphragm and any second-stage valve, at least one second stage valve being laterally offset from the center of its actuating diaphragm.

13. A fluid pressure regulator comprising a housing, a diaphragm responsive to pressure, a valve movable in response to flexure of said diaphragm, a stem from said valve cooperating with said diaphragm at a location offset from the center, a flexible valve seat secured to said stem, a yieldable mounting for said stem and seat, said yieldable mounting guiding the movement of said stem, whereby no non-yieldable guide frictionally cooperating with said stem is needed, a spring cooperating with said pressure responsive diaphragm for moving the same toward said valve, a plate between said spring and diaphragm immovably held to said diaphragm, an adjusting screw at the opposite end of said spring, a rotatable plate between said screw and spring, and an adhesive securing each end of said spring to its plate.

14. A fluid pressure regulator having in combination a casing provided with an inlet passage, an outlet passage, a nozzle between said passages, a movable valve member controlling fluid movement through said nozzle, said valve member being an inner portion of a resilient diaphragm clamped adjacent its periphery, a valve closing spring applying pressure against one side of said valve member diaphragm and pressing the latter toward said nozzle, a pressure responsive diaphragm spaced from the valve member diaphragm, and a stem of smaller diameter than and spaced from the inside of said nozzle extending therethrough between said diaphragms supported and yieldably guided by one of them without any rigid guide bearing for said stem for opening the valve member diaphragm by flexing it away from said nozzle under flexure of the pressure responsive diaphragm toward the valve member diaphragm, said nozzle, stem, and valve member diaphragm portion being offset from the axis of said pressure responsive diaphragm.

15. A regulator according to claim 14 in which said valve member diaphragm and nozzle constitute a second-stage valve of a multistage regulator having a first-stage valve and pressure responsive diaphragm for the first-stage valve which is substantially coaxial with the pressure responsive diaphragm of said second-stage valve, the stems of said valves overlapping longitudinally thereof whereby said regulator may be made more compact than is the case when the axis of one pressure responsive diaphragm is laterally offset with respect to the axis of the other.

16. A device according to claim 1 in which a coaxial handle is provided for adjusting said screw, said handle being slidable with respect to said screw and rotatable with the screw with respect to said casing, a complementary screw thread fixed with respect to the casing for cooperation with said screw, and mechanism for eliminating backlash between said screw and said complementary thread, whereby a longitudinal thrust on said handle is not transmitted to said spring, diaphragm, and valve.

17. A regulator according to claim 14 having a substantially coaxial helical spring cooperating with said pressure responsive diaphragm for opening said valve member, an adjusting screw for the end of said last mentioned spring away from its diaphragm, a freely rotatable plate between said adjusting screw and last mentioned spring, and a second plate between said spring and pressure responsive diaphragm, said last mentioned spring being non-rotatively secured to that plate which is contiguous the pressure responsive diaphragm and said last mentioned plate being non-rotatably secured to said pressure responsive diaphragm, said pressure responsive diaphragm being clamped in said casing against rotation, whereby any tilting of said pressure responsive diaphragm due to non-uniformity in distribution of spring pressure against it is substantially fixed angularly for any given pressure setting of said adjusting screw.

18. A regulator according to claim 17 in which a plurality of valves are arranged around the axis of said pressure responsive diaphragm for actuation thereby sequentially whereby each valve is better adapted to function at the same pressure for the same pressure setting of said pressure responsive diaphragm spring.

19. A regulator according to claim 14 in which said valve member diaphragm and nozzle constitutes a second-stage valve of a two-stage regulator having a first-stage valve, an intermediate pressure chamber and a second second-stage valve similar to the first mentioned second-stage valve and offset from the axis of said pressure responsive diaphragm, one second-stage valve opening in advance of the other whereby large fluid flow may be handled, yet accuracy of regulation obtained with small fluid flow.

20. In a fluid pressure regulator having a casing, a pressure responsive diaphragm clamped in said casing, a valve movable in response to flexure of said diaphragm, supply and discharge passages leading to and from said valve, pressure in the discharge passage being that on one side of said diaphragm, a spring cooperating with an opposite side of said diaphragm from that on which is the pressure in the discharge passage, an adjusting screw for said spring, a complementary thread for cooperation with said screw and fixed with respect to said casing, and a rotatable handle outside said casing and coaxial with said screw and spring for adjusting said screw, the stress on said spring and the pressure in said discharge passage, the combination therewith of the improvement for rendering pressure of the spring and that in said discharge passage independent of momentary changes due to a longitudinal component of thrust on said handle and due to looseness in the fit between said screw and its complementary thread, said improvement including a non-circular stem on said handle received within a cooperative non-circular recess deeper in an outer end portion of said spring adjusting screw than is the length of said stem, retaining means on the casing holding said handle against having its stem being withdrawn from said screw during use, transmitting a longitudinal thrust on said handle to said casing, and said complementary thread and screw being provided with means for elimination of backlash, there being longitudinal clearance between said screw and its handle, whereby any longitudinal thrust on the handle is transmitted to the casing and not to the screw.

21. A regulator according to claim 20 in which said spring has its end adjacent said diaphragm, non-rotatively fixed thereto, and a freely rotatable plate between the opposite end of said spring and said screw, whereby, after a change in stress on said spring and its return to some former setting, there will be no angular displacement between the spring and diaphragm, and any tilt in said diaphragm due to non-uniformity in application of spring pressure is not changed for a particular pressure setting.

22. A fluid pressure regulator having in combination a casing provided with an inlet passage, an outlet passage, a nozzle between said passages, a movable valve member controlling fluid movement through said nozzle, said valve member being an inner portion of a resilient diaphragm clamped adjacent its periphery, a valve closing spring applying pressure against one side of said valve member diaphragm and pressing the latter toward said nozzle, a pressure responsive diaphragm spaced from the valve member diaphragm, and a stem of smaller diameter than and spaced from the inside of said nozzle extending therethrough between said diaphragms supported and yieldably guided by one of them without any rigid guide bearing for said stem for opening the valve member diaphragm by flexing it away from said nozzle under flexure of the pressure responsive diaphragm toward the valve, said nozzle, stem, and valve member diaphragm portion being offset from the axis of said pressure responsive diaphragm, said valve member diaphragm and nozzle constituting a second stage valve of a multi-stage regulator having a first stage valve and pressure responsive diaphragm for the first stage valve which is substantially coaxial with the pressure responsive diaphragm of said second stage valve, the stems of said valves being offset from each other, a spring being provided for the pressure responsive diaphragm actuating the first stage or high pressure valve, a gastight enclosure around said last mentioned spring, and a gas passage provided within said casing connecting said gastight enclosure with said outlet passage, whereby outlet gas pressure assists said last mentioned spring in actuation of its diaphragm.

WILGOT J. JACOBSSON.

References Cited in the file of this patent

UNITED STATES PATENTS

| Number | Name | Date |
| --- | --- | --- |
| 407,911 | Warren | July 30, 1889 |
| 1,679,826 | Jenkins | Aug. 7, 1928 |
| 1,706,230 | Hilger | Mar. 19, 1929 |
| 1,944,185 | Langer | Jan. 23, 1934 |
| 1,957,972 | Mills | May 8, 1934 |
| 2,002,884 | Deming | May 28, 1935 |
| 2,057,133 | Bryce | Oct. 13, 1936 |
| 2,103,576 | Dockson | Dec. 28, 1936 |
| 2,107,726 | Bramsen | Feb. 8, 1938 |
| 2,156,823 | Stettner | May 2, 1939 |
| 2,301,031 | Ferguson | Nov. 3, 1942 |
| 2,370,245 | Jacobsson | Feb. 27, 1945 |
| 2,520,092 | Fredrickson et al. | Aug. 22, 1950 |

FOREIGN PATENTS

| Number | Country | Date |
| --- | --- | --- |
| 52,141 | Denmark | of 1936 |
| 602,798 | France | of 1926 |